2/7/84 OR 4,430,546

United States Patent [19]

[11] 4,430,546

[45] Feb. 7, 1984

Irons et al.

[54] PLASMA SPRAY GUN NOZZLE

[75] Inventors: Gary C. Irons, Sea Cliff; Dennis K. Buzzelli, Old Bethpage; John F. Klein, Port Washington; Richard T. Smyth, Huntington, all of N.Y.

[73] Assignee: Metco, Inc., Westbury, N.Y.

[21] Appl. No.: 292,762

[22] Filed: Aug. 14, 1981

[51] Int. Cl.[3] .............. B23K 9/00

[52] U.S. Cl. .............. 219/121 PY; 219/121 PN; 219/121 PP; 219/75; 239/132.3

[58] Field of Search ...... 219/121 P, 121 PM, 121 PP, 219/121 PQ, 76.16, 136, 75, 74; 239/132.1, 132.3

[56] References Cited

U.S. PATENT DOCUMENTS

| | | | |
|---|---|---|---|
| 3,830,428 | 8/1974 | Dyos | 219/121 PP |
| 3,858,072 | 12/1974 | Dembovsky | 219/121 PP |
| 4,058,698 | 11/1977 | Bykhovsky et al. | 219/121 PP |

OTHER PUBLICATIONS

Welding Hankbook, sixth edition, section two, "Welding Processes: Gas, Arc, and Resistance" p. 29.3.

*Primary Examiner*—M. H. Paschall

*Attorney, Agent, or Firm*—F. L. Masselle; E. T. Grimes; J. D. Crane

[57] ABSTRACT

A plasma spray gun nozzle with a thin annular coolant passage having extended life. The thin annular passage is located adjacent a thin nozzle which confines the arc formed in the nozzle. The dimensions of the thin annular passage and the wall thickness are selected to assure maximum nozzle life.

11 Claims, 4 Drawing Figures

PLASMA SPRAY GUN NOZZLE

BACKGROUND OF THE INVENTION

The present invention relates to the field of plasma spray guns and particularly to a plasma spray gun nozzle with a thin annular coolant passage which increases the nozzle life over that previously achieved with prior art designs.

In typical plasma flame spraying systems, an electrical arc is created between a water cooled nozzle (anode) and a centrally located cathode. An inert gas passes through the electrical arc and is excited thereby to temperatures of up to 30,000° F. The plasma of at least partially ionized gas issuing from the nozzle resembles an open oxy-acetylene flame. A typical plasma flame spray gun is described in U.S. Pat. No. 3,145,287.

The electrical arc of such plasma spray guns, being as intense as it is, causes nozzle deterioration and ultimate failure. One cause for such deterioration is the fact that the arc itself strikes the nozzle/anode at a point, thereby causing instantaneous melting and vaporizing of the nozzle surface. Deterioration is also caused by overheating the nozzle to the melting point so that part of the nozzle material flows to another location which may eventually cause the nozzle to become plugged.

There are varying degrees and rates associated with each cause for nozzle deterioration. Experience has shown that wall erosion, ultimately causing the coolant to burst through the nozzle wall, is another cause of nozzle failure. When the jacket bursts, coolant water is released into the arc region, resulting in a locally intense electric arc, causing parts to melt. Once a meltdown has occurred, gun repair can be very costly. The nozzle deterioration and failure problem is particularly severe at high power levels.

In seeking to overcome this problem, plasma flame spray guns have been designed with easily changed water cooled nozzles. During operation, water coolant is forced through passages in the nozzle to cool the nozzle walls. Even so, gradual, or sometimes rapid, deterioration occurs and, as a precaution against failure, the nozzles are usually replaced after a given number of hours of service. This practice of replacing the nozzle periodically, however, is quite costly because the interchangable nozzles are fairly expensive and many nozzles with considerable life remaining are thereby discarded.

Many factors are involved in determining the rate of deterioration and ultimate failure of a plasma spray gun nozzle. For the most part, nozzle operating conditions and geometry, gas type and flow rate, coolant flow rate and velocity influence the nozzle life, as well as does the nozzle cooling.

Some installations of plasma spraying equipment have included deionizers in the coolant system which, as indicated by recent studies, has enhanced the life of the nozzle. The reason for the nozzle life enhancement apparently arises from a reduction of scale formation within the coolant passages of the nozzle. However, under the more severe operating conditions, e.g. high power level, use of a deionizer alone is not sufficient to significantly improve nozzle life.

The prior art generally recognizes that cooling the nozzle wall is necessary and has the above-noted effect on nozzle life. The prior art, however, does not recognize the optimum design for nozzles and cooling passages in plasma flame spray guns, thus leaving the designer to endless experimentation in attempting to determine the optimum design for maximum nozzle life.

Therefore, it is the primary objective of the present invention to provide a plasma flame spray system designed to maximize nozzle life.

It is a further objective of the present invention to provide a nozzle for a plasma flame spray gun which is designed to maximize the operational life thereof.

It is still a further objective of the present invention to provide a nozzle for a plasma flame spray gun with a coolant passage therein designed to improve heat removal from the nozzle wall.

It is yet a further objective of the present invention to provide a nozzle for a plasma flame spray gun having a wall thickness which maximizes the nozzle life as defined by the equation $$\text{Life} = (W_{start} - W_{min})/R$$

where $W_{start}$ is the initial wall thickness, $W_{min}$ is the wall thickness at failure and R is the erosion rate in depth per unit time.

Another objective of the present invention is to provide a nozzle for a plasma flame spray gun having a wall thickness and coolant passage therein designed to minimize melting and flow of nozzle material, and thereby to reduce failure by plugging of the nozzle.

BRIEF DESCRIPTION OF THE INVENTION

In achieving the foregoing and other objectives of the present invention, the plasma flame spray system of the present invention has a nozzle designed for long life. The nozzle has a thin annular passage for directing coolant through the nozzle adjacent the thin nozzle walls directly subjected to the plasma flame and to arc contact. The wall thickness and the height of the annular coolant passage are selected to maximize nozzle life.

In addition, the plasma flame spray system may include means to remove ions and dissolved gases from the coolant. Tests have demonstrated that removal of certain ions and trapped gases from the coolant has the advantageous effect of increasing nozzle life. In combination with the optimally designed nozzle with a thin nozzle wall and a thin annular passage, the nozzle life is extended beyond what could be expected, considering the nozzle life improvement achieved with the optimal nozzle design by itself and with the deionizer and/or dissolved gas remover alone.

BRIEF DESCRIPTION OF THE DRAWING

The drawings illustrate various parts of a plasma spray gun according to the present invention wherein.

DETAILED DESCRIPTION OF THE INVENTION

Figure 1:
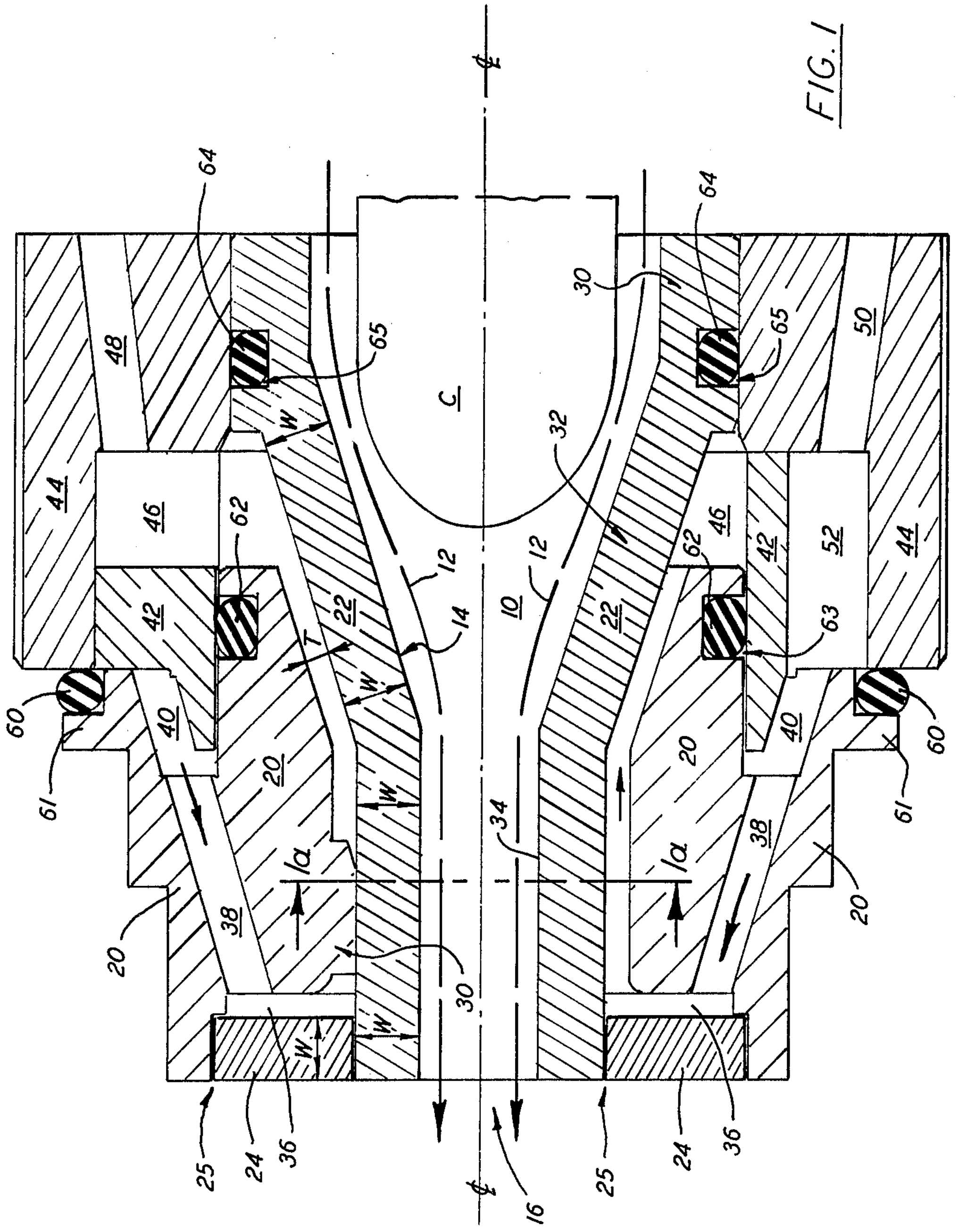
FIG. 1 is a longitudinal sectional view of a typical nozzle for a plasma flame spray gun according to the present invention.

Referring now to FIG. 1, the nozzle according to the present invention has an overall configuration somewhat like that of U.S. Pat. No. 3,145,287 and is designed to fit into plasma spray gun Types 3MB and 7MB manufactured by Metco, Inc., Westbury, N.Y. The nozzle of FIG. 1 has a central passage indicated generally at 10 through which gases travel in a direction indicated generally by the arrows 12. Entering the central passage 10 from the right is an elongated and rounded tipped cathode C which is electrically isolated from the other elements shown in FIG. 1. When the flame spray gun is operating, electrons travel in an arc from the cathode C to the inner wall of the nozzle indicated generally at 14. It should be noted that the arc contact point with the inner wall 14 does not remain at one position but tends to travel over a large portion of the inner wall 14. The arc excites the gases causing a plasma flame to issue from the exit end of the nozzle indicated generally at 16.

The nozzle of FIG. 1 is comprised of three pieces, an outer member 20, an inner member 22 defining the inner wall 14 and a washer-like member 24. These members 20, 22 and 24 are preferably made of substantially pure copper. Member 22 may include a liner (not shown) along the inner surface 14 formed of tungsten or the like having a very high melting point to minimize surface melting by the arc. The member 20 may be metal but is desirably made of electrically insulated material such as plastic or ceramic to prevent failure of the out gun parts by cross arcing if the nozzle wall should fail. The inner member is shaped to include an entrance portion 30, a tapered section 32 and an exit portion 34. The entrance portion has an inner wall which is cylindrical in shape and has a diameter greater than the diameter of the inner wall of the exit portion 34. The inner wall of the tapered section 32 connects the inner wall of the entrance portion 30 and the inner wall of the exit portion 34. The inner wall of the exit portion 34 is generally cylindrical in shape. The shape of the inner wall 14 may take on other configurations such as having either or both the entrance and the exit portions taper. Other shapes are also beneficial.

As is readily understood, the nozzle wall temperature is a major contributing factor to nozzle life, particularly the temperature at the point where the arc strikes. Reducing the sidewall temperature of the nozzle has the effect of increasing the nozzle strength, reducing melting migration, reducing erosion rate and increasing the nozzle life. Such a nozzle wall temperature reduction can be achieved by reducing the wall thickness between the coolant passages in the nozzle and the arc/plasma passage. When the wall temperature goes down, the erosion rate also goes down; however, there is a trade off to be made between structural integrity and the reduced erosion rate. The reduced temperature due to the reduced wall thickness must lower the erosion rate fast enough to compensate for the reduced depth of tolerable erosion.

The inner member 22 comprises the anode of the gun and is designed with a wall thickness W in the region likely to be in direct contact with the arc. The inner member is made out of substantially pure copper (preferably at least 99% pure) and, for this material, has a wall thickness W in the range of about 1.9 mm to 2.8 mm (0.075 to 0.110 inches).

Copper (substantially pure) is the preferred material for many of the parts of the nozzle because of its electrical and thermal properties. That is, copper is a good electrical and thermal conductor and yet has a relatively high melting point. Those of skill in the art will recognize that other metals or alloys with thermal and electrical properties substantially like those of copper can be used for the parts of nozzles according to the present invention although the dimensions may need to be adjusted somewhat to optimize nozzle life.

It has been found that the dimensions herein are important at a point radially outward of the point where the arc of the gun strikes the nozzle 40. This is determined by first making a nozzle of the desired shape and running it under the desired operating conditions for a short time. The place of maximum erosion will identify the location were the arc strikes the nozzle. The dimensions radially outward of the point where the arc strikes are then decided on.

The washer member 24 is made of substantially pure copper and has an inner diameter just slightly larger than the outer diameter of the inner member 22 adjacent the exit portion 16 thereof. The washer member 24 is pressed onto the inner member 22 and positioned in the manner shown in FIG. 1 and brazed thereto, thus forming a fluid impervious seal between the washer member 24 and the inner member 22.

Figure 1A:
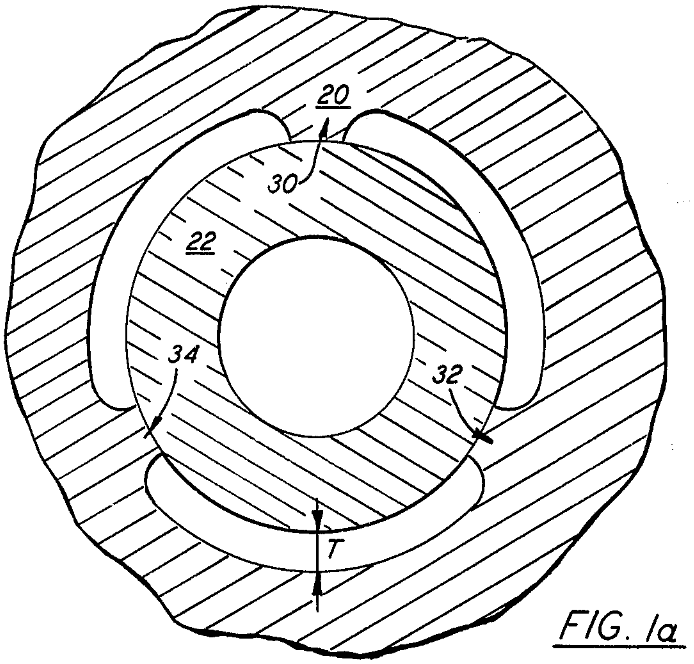
FIG. 1*a* is a sectional view taken along section line A—A of FIG. 1.

The outer member 20 may be made of substantially pure copper or other materials including alloys such as brass, plastics or ceramics and is shaped to fit together with the inner member 22 and the washer member 24 to form a coolant passage in the nozzle which communicates with the coolant passages of the flame spray gun to which it attaches to permit cooling the nozzle during operation thereof. The outer member has three positioning legs 30, 32 and 34 which are spaced as seen in FIG. 1*a* equally around the exit end 16 of the inner member 22. The legs 30, 32 and 34 are dimensioned so that the outer member 20 can be press fit onto the inner member 22 thereby forming a coolant passage between the inner member having a height of T in the radial direction from the center line CL. Through a thorough investigation, it has been found that an optimum height for the coolant passage is in the range of 0.76 mm to 1.27 mm (0.030 to 0.050 inches).

The outer member 20 is additionally shaped to cooperate with the inner member 22 and the washer-like member 24 and is bonded to the washer member of the contact area indicated at 25 to define a cooling passage 36 which communicates with the passage disposed between the inner member 22 and the outer member 20. Communicating with the passage 36 is a plurality of bore holes 38 which are preferably disposed evenly around the outer member 20 to provide a plurality of coolant passages from the generally annularly-shaped passage 40, which is formed between the outer member 20 and the member 42 which fits into the body of the plasma spray gun 44 and forms a wall between the coolant infeed and the coolant outfeed.

The plasma spray gun body 44 is shaped to provide a further generally annularly-shaped passage 46 which communicates with an exit passage 48 thereby providing an output path for coolant fluid to leave the the nozzle.

The plasma spray gun body 44 additionally includes an entrance passage 50 which provides a coolant infeed communicating with the passage 52 formed between the members 44, 42 and 20. This passage 52 communicates with the generally annularly shaped passage 40 formed between members 20 and 42. The cooling fluid enters the passage 50 and then passage 52 and thereafter into the annular passage 40. From the annular passage 40, the fluid flows through the plurality of passages 38 into the passage 36. From the passage 36, the fluid passes through the thin annular passage formed between members 20 and 22. The coolant flow rate is sufficient to maintain the exterior surface of member 22 at a temperature close to 100° Centrigade. The fluid then passes from the thin annular passage defined between the inner member 22 and the outer member 20 into the substantially annularly shaped passage 46 and exits through the passageway 48.

The coolant in the nozzle does not leak out of the coolant passages because O-rings are provided to prevent leaking. One such O-ring 60 is located between a flange 61 of the outer member 20 and the forward wall of the flame spray gun 44. A second O-ring 62 is located in an annular pocket, indicated generally at 63 in the outer member 20. The O-ring forms a seal between the member 20 and the member 42. A third O-ring 64 is located in an annular pocket 65 in the inner member 22 to form a seal between the gun body 44 and the inner member 22.

The exact fluid used for cooling the nozzle according to the present invention is not critical, although it is desirable to have a fluid which can rapidly absorb the heat flowing through the inner member 22 from the intense heat zone in the region of the arc to the cooler zone in the region of the thin annular passage. The rate of fluid flow is preferably sufficient to prevent the fluid in the thin annular passage between the inner member 22 and the outer member 20 from boiling due to contact with the exterior surface of the inner member 22. The principle reason for this is that preventing boiling of the fluid also prevents scale formation on the exterior surface of the inner member 22 which therefore promotes longer useful life of the nozzle. A high coolant flow rate also reduces the extent of gases which become dissolving in the coolant which has the beneficial effect of improving nozzle life.

The water coolant should flow through the thin annular passage with a reynolds Number of about 2000 to 100,000 and preferably 5000 to 50,000, for example, about 10,000. The Reynolds Number depends, as is well known, on the height of the passage, but will generally be achieved with water flow velocity between 0.6 and 60 meters/second, for example, about 6 meters/second or, alternatively, about 0.25 liters/second flow rate.

These figures are achieved with a flow rate for water through the slots in the range of 0.76 to 46 meters per second (2.5 to 150 feet per second), with the preferred range being between 3 to 18 meters per second (10 to 60 feet per second). Actual coolant speed of about 6 meters per second (20 feet per second) has given good results. This coolant speed translates to about 0.25 liters per second (4 gallons per minute of water through a nozzle having dimensions in the preferred range.

Figure 2:
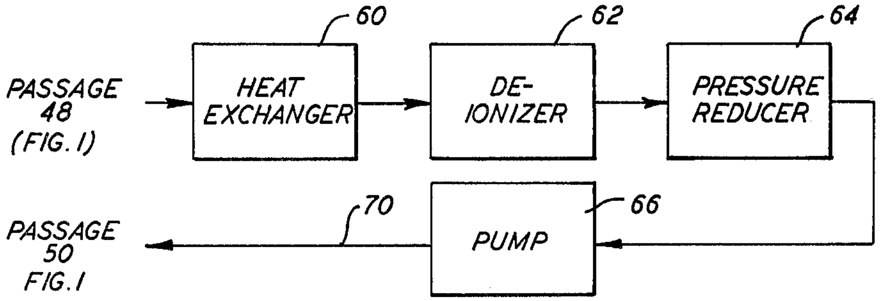
FIG. 2 shows diagramatically a closed loop cooling system for the nozzle of FIG. 1.

Referring now to FIG. 2, the cooling system for the nozzle according to the present invention may take the form shown in FIG. 2 or it may comprise a simple system wherein a source of water is coupled to the passage 50 and the fluid exiting from passage 48 is simply allowed to be discharged. The system of FIG. 2, however, is a closed loop system which offers, among other advantages, a means for reducing the cost of coolant water used by the system.

The water exiting from the flame spray gun is at a higher temperature than that entering the gun and exits the gun through the passageway 48 and eventually reaches a heat exchanger 60 which may comprise any conventional heat exchanger arrangement. Once the temperature of the cooling fluid is reduced, it then passes through a deionizer 62 which removes ions from the cooling fluid by means of an ion transfer resin contained in the deionizer 62. A suitable resin for this purpose is known as Red Line mixed bed resin and is manufactured by Crystalab. It has been found that the nozzle life can be extended by removing ions from the cooling fluid.

After exiting the deionizer, the fluid then passes through a dissolved gas remover 64, which may comprise a pressure reducer such as used in power plants. In the process of reducing the pressure of the cooling fluid, dissolved gases within the fluid are released. Dissolved gases can be removed by other approaches such as passing the cooling fluid through a charcoal bed. It has been found that dissolved gases also have an adverse effect on nozzle life and that removing them from the cooling fluid does improve nozzle life.

Similarly, a deoxygenator containing a suitable resin may be used to remove dissolved gas. When a resin is used to remove dissolved gas, it is desirable to locate the resin between the pump 66 and gun and preferably as close to the gun as possible.

In the illustrated embodiment of FIG. 2, on leaving the pressure reducer 64, the fluid then passes through a pump 66 which raises the fluid pressure on the output side of the pump 70 to a sufficient level so as to provide the desired cooling fluid flow rate through the flame spray gun. As indicated, the output 70 of the pump 66 communicates with the passage 50 so that the cooling fluid, leaving the pump 66, will be directed through the cooling passages within the nozzle of FIG. 1 and ultimately back to the heat exchanger 60.

While the arrangement shown in FIG. 2 includes a heat exchanger 60, a deionizer 62 and a gas remover 64, each with a specific function, it is possible to operate the flame spray gun of the present invention including a nozzle of the type shown in FIG. 1 with a closed loop cooling system including only a heat exchanger 60 and a pump 66. These two elements are necessary to assure sufficient coolant flow through the nozzle and to assure that the cooling fluid does not absorb so much heat that it is no longer useful as a coolant.

As indicated above, however, the deionizer 62 does have an advantageous effect in that it has been shown that deionizing the cooling fluid has the effect of improving nozzle life. Test results of the present system indicate, however, that adding a deionizer 62 to the system including a thin wall and a thin annular passage nozzle of FIG. 1 results in a product life improvement is greater than one would expect, considering the nozzle life improvement achieved by the thin annular passage nozzle design of FIG. 1 by itself and the nozzle life improvement achieved by a deionizer, by itself. Accordingly, it is advantgaeous, though not necessary, for systems according to the present invention to include a deionizer of the type described.

The system of FIG. 2 also includes a gas remover 64 which, as already indicated, may comprise a pressure reducing device of the type used in the electrical utility industry, although other pressure reducers may be used. The purpose of the gas remover 64 is to remove dissolved gases to escape from the cooling fluid. As indicated above, the gas remover 64 is not an essential element of the present invention but it may be used in cooperation with other system elements to achieve an increase in nozzle life.

Figure 3:
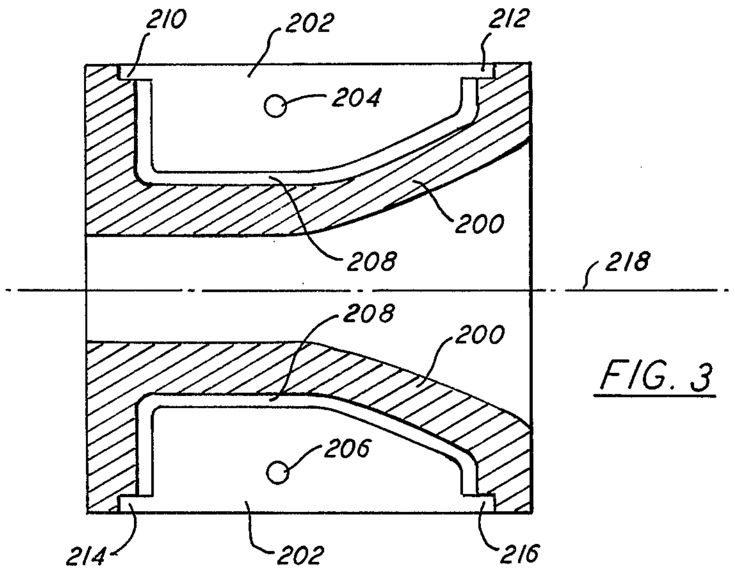
FIG. 3 is a cross-sectional view through an alternative nozzle according to the present invention.

While the foregoing description has emphasized the design of a nozzle for a flame spraying gun as illustrated in FIGS. 1 and 1*a* which has a thin annular passage for the coolant, those of skill in the art will readily recognize that the specific design may take other forms. For example, the nozzle may be designed with an inner member, such as at 200 in FIG. 3, which is made of the same material as member 22 in FIG. 1. The outer member 202 of FIG. 3 is made in two halves, each with holes 204 and 206 therethrough so they can be screwed or bolted together to form a coolant passage 208 between the inner member 200 and the outer member 202. The outer member 202 has centering tabs 212, 214, 216 and 218, which fit into notches in the inner member 200, which serve to center the outer member 202 with respect to the central axis 218 and to position the member 202 with respect to the inner member 200 so that the passage 208 has the desired dimensions according to the present invention. This arrangement is described in somewhat greater detail in U.S. Patent Application Ser. No. 292,763, filed Aug. 14, 1981, entitled "Heavy Duty Plasma Spray Gun." That application also describes a gun which can use a nozzle of the present invention as shown in FIG. 3.

The above and other changes may be made to the nozzle and systems of FIGS. 1-3 without departing from the spirit and scope of the invention as defined in the following claims.

What is claimed is:

1. In a plasma spray gun, a nozzle comprising, in combination:

an inner member made of a fluid impervious material defining a passage for channeling of gases through an electrical arc terminating in an area of the inner surface of said inner member, said inner member having a uniform wall thickness in substantially the entire region of where the arc terminates in the range of about 1.9 to 2.8 mm; and an outer member at least partially surrounding said inner member and forming a substantially single coolant passage between said outer member and said inner member in the region radially outward of where said electrical arc terminates, said coolant passage having a uniform distance T between said outer member and said inner member in the range of about 0.76 mm. to 1.27 mm. in substantially the entire region radially outward of the area where said arc terminates on said inner member.

2. The combination of claim 1 wherein said inner member is made of a material having substantially the same electrical and thermal properties as substantially pure copper.

3. The combination of claim 1 wherein said inner member is made of substantially pure copper.

4. The nozzle of claim 1 wherein said inner member and said outer member are positioned relative to each other by at least three legs extending from one said member toward the other said member.

5. The combination of claim 1 additionally including means to force a cooling fluid through said cooling passage.

6. The combination of claim 5 additionally including means to recirculate said cooling fluid through said cooling passage.

7. The combination of claim 6 additionally including a heat exchanger for removing heat from said cooling fluid.

8. A plasma spray gun system comprising, in combination:

an inner member defining a central passage for channeling of gases which are excited into a plasma by an electrical arc terminating in an area of the inner surface of said inner member, said inner member being made of a material having substantially the same electrical and thermal characteristics as substantially pure copper, said inner member having a wall thickness in substantially the entire region of where the arc terminates in the range of about 1.9 mm to 2.8 mm.; and an outer member at least partially surrounding said inner member and forming substantially a single coolant passage between said outer member and said inner member in the region disposed radially outward of the area where said electrical arc terminates, said coolant passage having a uniform distance T between said outer member and said inner member in the range of about 0.76 mm. to 1.27 mm. in substantially the entire region radially outward of where the arc terminates on said inner member;

coolant recirculating means communicating with said coolant passage formed between said inner member and said outer member to circulate a cooling fluid through said coolant passage to cool said inner member sufficiently to prevent rapid deterioration thereof due to the intense heat of the plasma flame produced by the electrical arc; and heat exchanger means coupled to said coolant recirculating means to remove heat from said cooling fluid.

9. The combination of claim 1 wherein said outer member is made of an electrical insulating material.

10. A process for cooling a plasma spray gun nozzle comprising:

passing fluid through a coolant passage between an outer member and an inner member;

said inner member defining a passage for channeling of gases through an electrical arc terminating in an area of the inner surface of said inner member, said inner member having a substantially uniform wall thickness in substantially the entire region radially outward of where the arc terminates in the region of about 1.9 mm. to 2.8 mm;

said coolant passage having a substantially uniform distance T between said inner and said outer member in substantially the entire region radially outward of where the arc terminates in the range of about 0.76 mm. to 1.27 mm.;

said fluid coolant having a Reynolds Number in the range of about 200 to 100,000.

11. The process of claim 10 wherein said inner member is manufactured of a material having substantially the same electrical and thermal properties as substantially pure copper.

* * * * *